March 22, 1960    H. J. FELDHAKE    2,929,159
MATHEMATICAL FORMULA DEMONSTRATOR
Filed March 27, 1959    2 Sheets-Sheet 1

Fig_1

INVENTOR.
HERBERT J. FELDHAKE
BY
Lawrence S. Epstein
ATTORNEYS

March 22, 1960     H. J. FELDHAKE     2,929,159
MATHEMATICAL FORMULA DEMONSTRATOR Filed March 27, 1959     2 Sheets-Sheet 2

INVENTOR.
HERBERT J. FELDHAKE
BY
Lawrence S. Epstein
ATTORNEYS

United States Patent Office  2,929,159
Patented Mar. 22, 1960

2,929,159

MATHEMATICAL FORMULA DEMONSTRATOR

Herbert J. Feldhake, Chicago, Ill.

Application March 27, 1959, Serial No. 802,582

15 Claims. (Cl. 35—34)

(Granted under Title 35, U.S. Code (1952), sec. 266)

The invention described herein may be manufactured and used by or for the Government of the United States of America for governmental purposes without the payment of any royalties thereon or therefor.

This application is a continuation-in-part of Serial No. 629,202, filed December 18, 1956, now abandoned, and Serial No. 629,201, filed December 18, 1956.

This invention relates to a device providing a physically meaningful demonstration of mathematical formulas and, in particular, to such a device for the demonstration of the formula for the volume of cones and pyramids.

Mathematics is an abstract subject which is generally taught by means of symbols and figures drawn upon a blackboard. It is a well-known fact that many pupils find it difficult to learn by this method, but are aided in their learning by physical demonstrations of abstract principles and the properties of geometrical forms.

The present invention provides a device for demonstrating the physical meaning of mathematical formulas containing terms of the area and volume type (second and third order terms). Terms on one side of the formula are represented by areas or volumes formed in a containing structure preferably fabricated from transparent plastic material. Terms on the other side of the formula are represented by other areas or volumes of simple, easily comprehended, geometrical forms, such as squares, rectangles or cubes, equivalent in total area or volume, respectively, to the total area or volume of the terms on the first side of the formula. The areas or volumes representing the terms on one side of the formula communicate with those on the other side. A freely mobile fluid material, preferably spherical pellets, covers the total area or fills the total volume representing all terms on one side of the formula. Equivalence of both sides of the formula is demonstrated by transferring the fluid material to the areas or volumes corresponding to the terms on the other side of the formula.

An object of the invention is to provide a device particularly useful in teaching mathematics.

Another object is to provide a device capable of furnishing a physically meaningful demonstration of a mathematical formula containing second or third order terms.

A further object is to provide a device capable of furnishing a physically meaningful demonstration of the formula for the volume of a cone.

A further object is to provide a device capable of furnishing a physically meaningful demonstration of the formula for the volume of a pyramid.

Still another object is to provide a device which enables students to more quickly and easily understand the meaning of certain mathematical formulas and to remember them for a longer period of time.

Other objects and many of the attendant advantages of this invention will be readily appreciated as the same becomes better understood by reference to the following detailed description when considered in connection with the accompanying drawings wherein.

Figure 1:
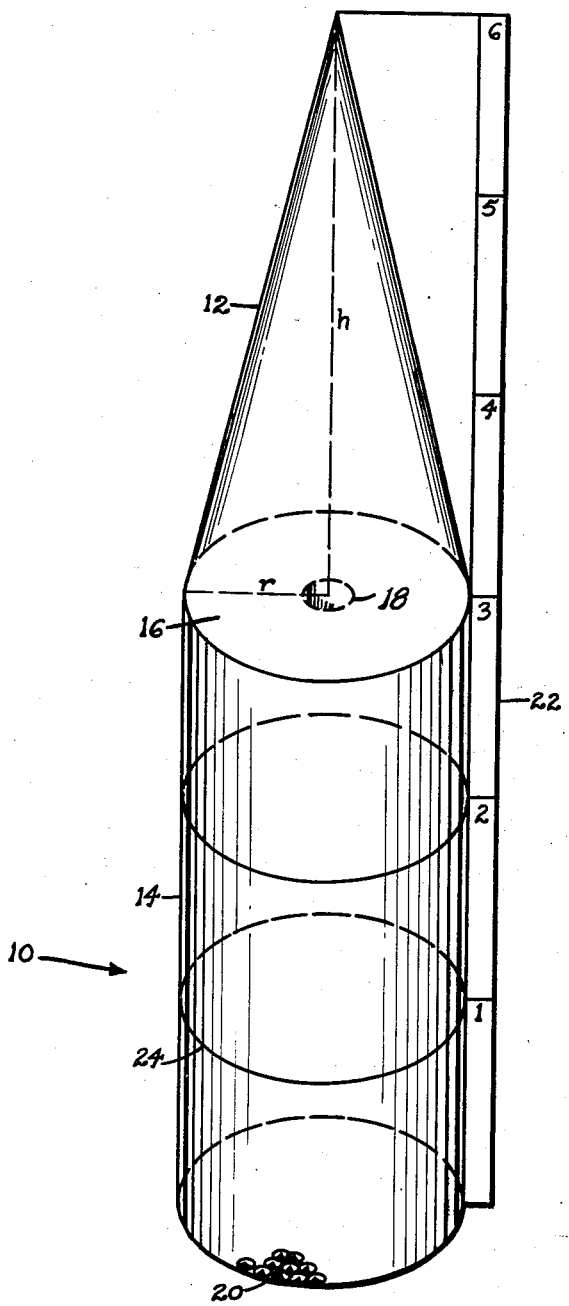
Figure 1 is a modified perspective view of a cone form of the invention. Dimensional thickness is ignored for added clarity.

The embodiment of the invention shown in Figure 1 comprises an integral hollow structure 10 consisting of a hollow cone 12 and a hollow cylinder 14. The two sections 12 and 14 are preferably separated by a partition 16 containing an aperture 18 therein, and lying in the plane of the conjunctive bases of the cone and cylinder, although other means of denoting the extent of the sections, such as a wire screen, may be employed. If desired, means for denoting the extent of the sections 12 and 14 may be omitted entirely, in which event the observer is left to judge for himself the location of the plane of separation.

A sufficient quantity of freely mobile fluid material to completely fill the volume of the cone 12 is contained within the hollow structure 10. This fluid material may preferably comprise spherical pellets 20 such as marbles or buckshot, or fluid materials such as sand or colored liquid. A hole may be provided initially to introduce the fluid material into the structure 10, after which the hole may be sealed.

The structure 10 is preferably fabricated from transparent material such as transparent plastic. Of course, other suitable materials such as glass, wood, metal, etc. may be employed.

If the structure 10 is composed of transparent material, it may be fabricated as a single integral unit. When a liquid is used as the freely mobile material, the structure 10 must, of course, be leak-proof.

If non-transparent materials are utilized, the structure 10 may consist of separate conic and cylindrical sections with the apertured partition forming the base of the cone or one base of the cylinder. A manually removable clamping device may be employed to hold the sections together.

The height of the cylinder 14 is equal to the height of the cone 12. To indicate this, a ruled stick 22 divided into six equal segments may be affixed to one side of the cylinder 14. Marker lines 24 dividing the cylinder 14 into thirds may also be scribed on the outside or inside surface of the cylinder 14.

As an alternative, the height of the cylinder 14 may be made only one-third that of the cone 12.

The formula for the volume of a cone is $\frac{1}{3}Bh$, where $B$ is the area of the circular base and $h$ is the altitude. ($B$ equals $\pi r^2$, $r$ being the radius of the base.) The product $\frac{1}{3}Bh$ is equal to the volume of a cylinder having a circular base area equal to $B$ and a height of $\frac{1}{3}h$. This, of course, is the volume of the lower third of the cylinder 14.

Thus, to demonstrate the equivalence of the volume of the cone to one-third the volume of a cylinder having the same base area and the same height as the cone, the hollow structure 10 is held in such position that the pellets 20 completely fill the cone 12. The structure 10 is then inverted so that the pellets 20 are transferred through the aperture 18 into the cylinder 14. The pellets 20 are then seen to completely occupy the lower third of the cylinder 14, the top level of the pellets 20 coinciding with the first scribed line.

Figure 2:
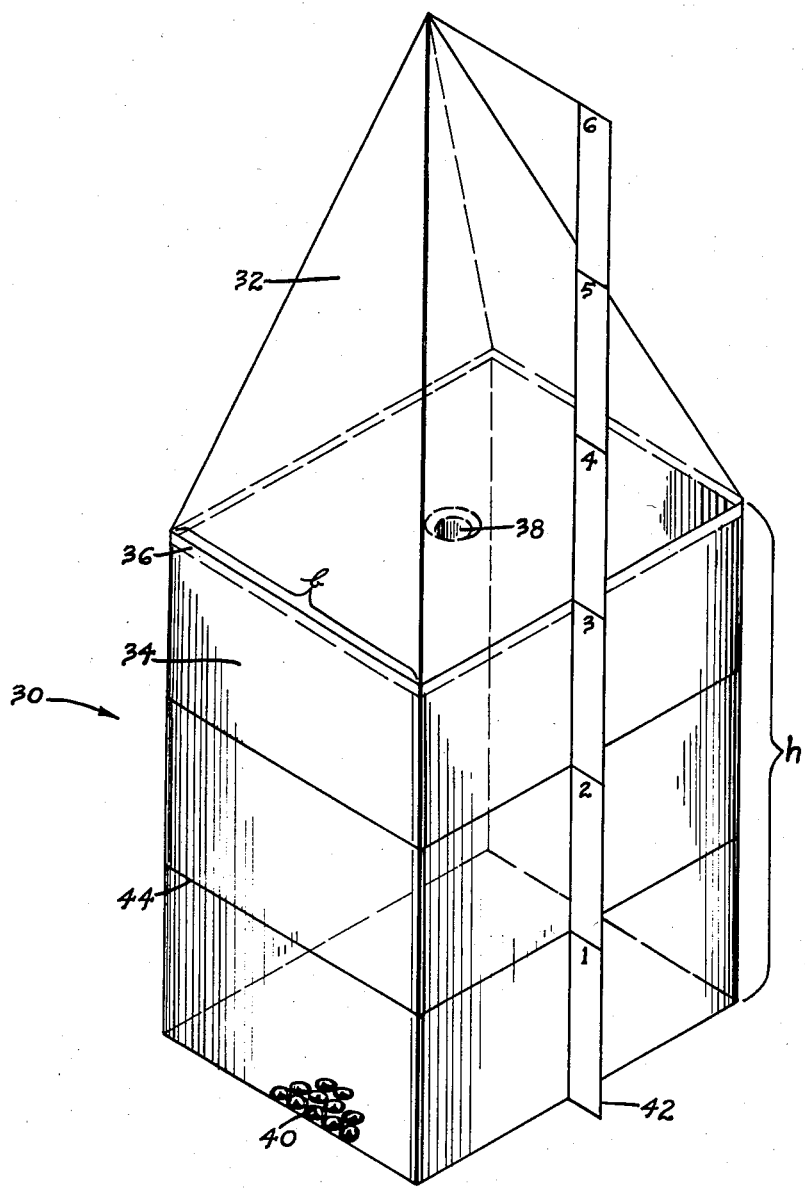
Figure 2 is a perspective view of a pyramid form of the invention.

The embodiment of the invention shown in Figure 2 comprises an integral hollow structure 30 consisting of a pyramidal section 32 and a rectangular section 34. The two sections 32 and 34 are preferably separated by a partition 36 containing an aperture 38 therein and lying in the plane of the conjunctive bases of the sections, although other means of denoting the extent of the sections, such as a wire screen, may be employed. If desired, means for denoting the extent of the sections 32 and 34 may be omitted entirely, in which event the observer is left to judge for himself the location of the plane of separation between the two volumes.

A sufficient quantity of freely mobile fluid material to completely fill the volume of the pyramidal section 32 is contained within the hollow structure 30. The fluid material may preferably comprise spherical pellets 40 such as marbles or buck-shot, or fluid materials such as sand or colored liquid. A hole may be provided initially to introduce the fluid material into the structure, after which the hole may be sealed.

The structure 30 is preferably fabricated from transparent material such as transparent plastic. Of course, other suitable materials such as glass, wood, metal, etc. may be employed.

If the structure 30 is composed of transparent material, it may be fabricated as a single integral unit. When a liquid is used as the freely mobile material, the structure 30 must, of course, be leak-proof.

If non-transparent materials are utilized, the structure 30 may consist of separate pyramidal and rectangular sections with the apertured partition forming the base of the pyramid or one base of the rectangular section. A manually removable clamping device may be employed to hold the sections together.

The height of the rectangular section 34 is equal to the height of the pyramidal section 32. To indicate this, a ruled stick 42 divided into six equal segments, may be affixed to one side of the rectangular section 34. Marker lines 44 dividing the rectangular section 34 into thirds may also be inscribed on the outside or inside surface of the rectangular section.

As an alternative, the height of the rectangular section 34 may be made only one-third that of the pyramidal section 32.

The formula for the volume of a pyramid is $\frac{1}{3}b^2 h$, where $b$ is the length of any side of the base ($b^2$ being the area of the base) and $h$ is the altitude of the pyramid. The product $\frac{1}{3}b^2 h$ is equal to the volume of a rectangular prism having a square base area with each side equal to $b$ and a height of $\frac{1}{3}h$. This, of course, is the volume of the lower third of the rectangular section 34.

Thus, to demonstrate the equivalence of the volume of the pyramid to one-third the volume of a rectangular prism having the same base area and height as the pyramid, the hollow structure 10 is held in such position that the pellets 40 completely fill the pyramidal section 32. The structure 30 is then inverted so that the pellets 40 are transferred through the aperture 38 into the rectangular section 34. The pellets 40 are then seen to completely occupy the lower third of the rectangular section 34, the top level of the pellets 40 coinciding with the first scribed line.

Obviously many modifications and variations of the present invention are possible in the light of the above teachings. It is therefore to be understood that within the scope of the appended claims the invention may be practiced otherwise than as specifically described.

What I claim is:

1. A device for providing a physical demonstration of the mathematical formula for the volume of a cone comprising, in combination: a hollow structure comprising a cone and a cylinder fitted together so that the base of said cone forms one base of said cylinder, the base of said cone and the bases of said cylinder being equal in area, said base of said cone being formed with an aperture therein to provide communication between said cone and said cylinder; and freely mobile fluid material in sufficient amount to completely occupy the internal volume of said cone, said aperture being of sufficient dimension to permit transfer of said material between said cone and said cylinder.

2. A device as set forth in claim 1, wherein said cone and said cylinder are independent units adapted to be temporarily fastened together, the height of said cylinder being equal to at least one-third the altitude of said cone.

3. A device as set forth in claim 1, wherein said cone and said cylinder are independent units adapted to be temporarily fastened together, the height of said cylinder being equal to the altitude of said cone.

4. A device as set forth in claim 1, wherein said cone and said cylinder are independent units adapted to be temporarily fastened together, the height of said cylinder being equal to the altitude of said cone, and including measuring means marking off a cylinder height equal to one-third the altitude of said cone.

5. A device for providing a physical demonstration of the mathematical formula for the volume of a cone comprising, in combination: a transparent, hollow structure comprising a cone and a cylinder, said cone and cylinder having equal base areas and being fitted together base-wise to form a single integrated unit; partitioning means positioned between said cone and cylinder to form a base plane for said cone and cylinder, said partitioning means formed with at least one aperture therein to provide communication between said cone and cylinder; and freely mobile fluid material within said structure in sufficient amount to completely occupy the internal volume of said cone, said aperture being of sufficient dimension to permit transfer of said mobile material between said cone and cylinder.

6. A device as set forth in claim 5, wherein said freely mobile fluid material comprises spherical pellets.

7. A device as set forth in claim 5, wherein said device is fabricated from a plastic material.

8. A device as set forth in claim 5, wherein said cylinder has a height equal to that of the cone, and including measuring means marking off a cylinder height equal to one-third the altitude of said cone.

9. A device as set forth in claim 5, wherein said cylinder has a height equal to at least one-third the altitude of said cone.

10. A device for providing the physical demonstration of the mathematical formula for the volume of a pyramid comprising, a transparent hollow structure comprising a pyramid, a hollow prism member extending from said pyramid having a base area equal to the base area of said pyramid and a height equal to at least one-third the height of said pyramid, the base of said pyramid forming one of the sides of said prism to provide an integrated unit having a combined single hollow chamber therein, and freely mobile fluid material within said structure in sufficient amount to completely occupy the internal volume of said pyramid.

11. The device as set forth in claim 10, wherein measuring means extends along the length of the pyramid and prism whereby visual marking off the volume of the pyramid and prism to demonstrate the formula $V = \frac{1}{3}b^2 h$ may be accomplished.

12. A device as set forth in claim 10, wherein said device is fabricated from a plastic material.

13. A device as set forth in claim 10, wherein said freely mobile material comprises spherical pellets.

14. A device for providing a physical demonstration of the mathematical formula for the volume of a pyramid comprising, in combination: a transparent, hollow structure comprising a pyramid and a prism, said pyramid and prism having equal base areas and being fitted together base-wise to form a single integrated unit, said prism being equal to at least $\frac{1}{3}$ the height of the pyramid; partitioning means positioned between said pyramid and prism to form a single base plane for both said pyramid and said prism, said partitioning means formed with at least one aperture therein to provide communication between said pyramid and prism; and freely mobile fluid material within said structure in sufficient amount to completely occupy the internal volume of said pyramid, said aperture being of sufficient dimension to permit transfer of said fluid material between said pyramid and prism.

15. A device as set forth in claim 14, wherein said freely mobile material comprises spherical pellets.

References Cited in the file of this patent

UNITED STATES PATENTS

| | | |
|---|---|---|
| 296,018 | Kennedy | Apr. 1, 1884 |
| 595,455 | Glidden | Dec. 14, 1897 |

FOREIGN PATENTS

| | | |
|---|---|---|
| 175,084 | Austria | June 10, 1953 |
| 22,006 | Great Britain | of 1903 |